United States Patent
Iverson

(10) Patent No.: US 11,361,139 B2
(45) Date of Patent: Jun. 14, 2022

(54) CONTINUOUS GLOBAL REPRESENTATION OF LOCAL DATA USING EFFECTIVE AREAS IN INTEGRATED CIRCUIT LAYOUTS

(71) Applicant: Synopsys, Inc., Mountain View, CA (US)

(72) Inventor: Ralph Iverson, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/175,312

(22) Filed: Feb. 12, 2021

(65) Prior Publication Data
US 2021/0256189 A1 Aug. 19, 2021

Related U.S. Application Data

(60) Provisional application No. 62/976,245, filed on Feb. 13, 2020.

(51) Int. Cl.
*G06F 30/00* (2020.01)
*G06F 30/392* (2020.01)
*G06F 30/398* (2020.01)
*G06F 111/04* (2020.01)

(52) U.S. Cl.
CPC .......... *G06F 30/392* (2020.01); *G06F 30/398* (2020.01); *G06F 2111/04* (2020.01)

(58) Field of Classification Search
CPC ... G06F 30/392; G06F 30/398; G06F 2111/04
See application file for complete search history.

(56) References Cited

U.S. PATENT DOCUMENTS 8,336,005 B2 * 12/2012 Taguchi ................. G06F 30/39
716/54
10,002,448 B2 * 6/2018 Taylor ..................... G06T 11/20
10,445,461 B2 * 10/2019 Zhang .................. G06F 30/398

FOREIGN PATENT DOCUMENTS

CN 102323960 A * 1/2012
WO WO-9747035 A1 * 12/1997 ....... H01L 21/31051

* cited by examiner

*Primary Examiner* — Naum Levin
(74) *Attorney, Agent, or Firm* — Weaver Austin Villeneuve & Sampson LLP

(57) ABSTRACT

A method for representing a layout of an integrated circuit (IC) includes, in part, determining multiple regions of the IC layout based on one or more parameters, determining multiple areas associated with the multiple regions where each area has a characteristic of a region of the multiple regions, assigning a first set of values to locations of the IC layout outside the multiple areas, assigning a second set of values to locations of the IC layout within the multiple areas, and, in response to a determination that a location of the IC layout is in two or more overlapping areas of the multiple areas, determining a value to assign to the location in accordance with the values of the two or more overlapping areas. The method further includes generating data representative of the IC layout design in accordance with the first and second set of values, and the assigned value.

20 Claims, 14 Drawing Sheets

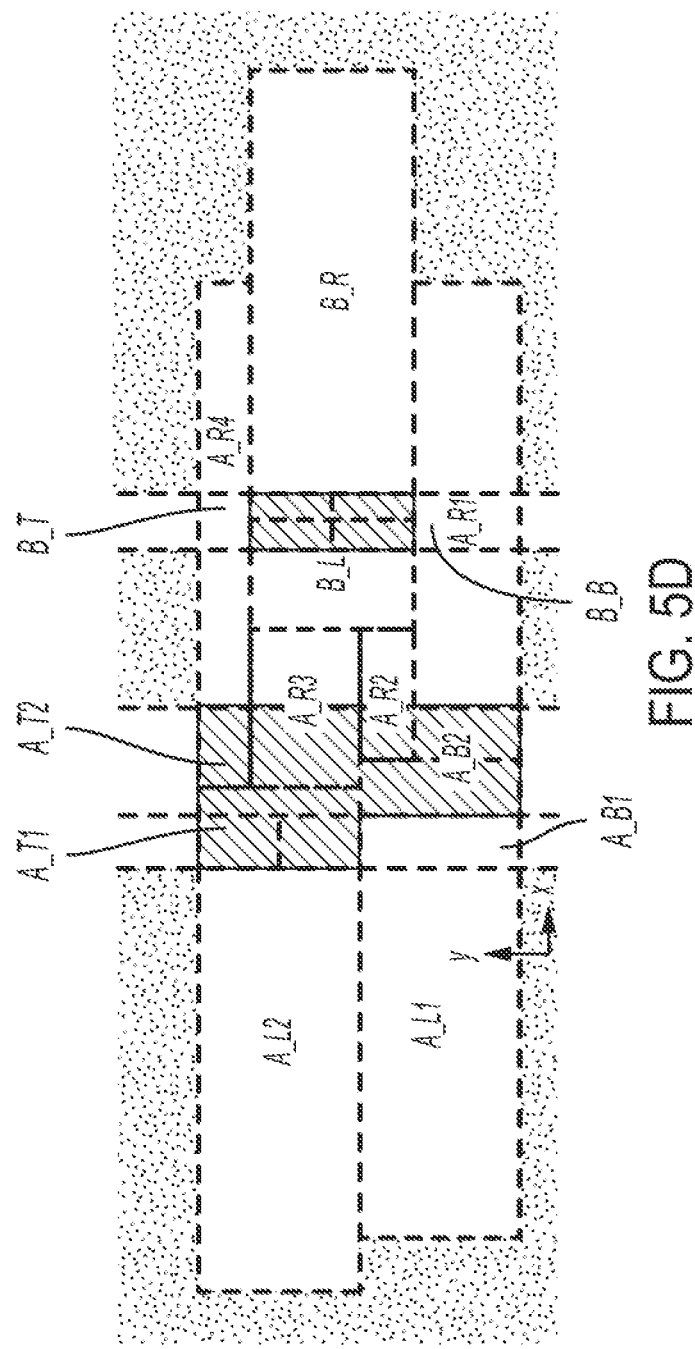

CONTINUOUS GLOBAL REPRESENTATION OF LOCAL DATA USING EFFECTIVE AREAS IN INTEGRATED CIRCUIT LAYOUTS

RELATED APPLICATIONS

The present application claims priority to U.S. Provisional Application Ser. No. 62/976,245, titled "SYSTEMS AND METHODS FOR CONTINUOUS GLOBAL REPRESENTATION OF LOCAL DATA USING EFFECTIVE AREAS IN AN INTEGRATED CIRCUIT LAYOUT," filed Feb. 13, 2020, the contents of which are incorporated herein by reference in their entirety.

TECHNICAL FIELD

The present disclosure relates generally to integrated circuit fabrication and, more particularly, to continuous global representation of local data using effective areas in integrated circuit layouts.

BACKGROUND

In integrated-circuit fabrication technology, some parameters (e.g., the thickness of a planar dielectric) vary significantly across an integrated circuit layout. Rules for generating parameter values, however, often depend on parameters that are not well defined everywhere throughout an integrated circuit layout. Even where parameters are well defined, the parameters may not necessarily be continuous across areas of an integrated circuit layout.

SUMMARY

In some embodiments, a method for representing a layout of an integrated circuit is provided. In some embodiments, the method includes determining multiple regions of an integrated circuit (IC) layout design based on one or more parameters, at least one region having a characteristic. In some embodiments, the method further includes determining multiple areas, where each area of the multiple areas has a characteristic of a region of the multiple regions. In some embodiments, the method further includes assigning first values to locations of the IC layout design outside the multiple areas and assigning second values to locations of the IC layout design within the multiple areas. In some embodiments, the method further includes, in response to a determination that a location of the IC layout design is located in two or more overlapping areas of the multiple areas, determining a generated value associated with the location based at least in part on values of the two or more overlapping areas of the multiple areas. In some embodiments, the method further includes generating, using a processor, an integrated circuit (IC) representation of the IC layout design based at least in part on the first values, the second values, and the generated value.

In some embodiments, the generated value determined based at least in part on values of the two or more overlapping areas of the multiple areas includes a weighted average of the values of the two or more overlapping areas of the multiple areas.

In some embodiments, the multiple regions comprises one or more of multiple points of the integrated circuit (IC) representation, multiple line segments of the integrated circuit (IC) representation, or multiple contiguous regions of the integrated circuit (IC) representation.

In some embodiments, determining the multiple areas includes, for each contiguous region as a region, determining a contiguous region by sweeping the contiguous region in an x-direction and a y-direction, where the contiguous region has a first length and a first width. In some embodiments, determining the multiple areas further includes, for each line segment as a region, determining a rectangle by sweeping the line segment in the x-direction, and the y-direction, where the rectangle has a second length and a second width. In some embodiments, determining the multiple areas further includes, for each point as a region, determining a line by sweeping the point in one of the x-direction, or the y-direction, where the line has a third length.

In some embodiments, one or more of the first length, the second length, or the third length is determined based at least in part on a portion, $x1$, of a length of the length of the corresponding region, where $x1>0$.

In some embodiments, one or more of the first width, or the second width is determined based at least in part on a portion, $x2$, of a width of the corresponding region, where $x2>0$.

In some embodiments, one or more of the first length, the second length, the third length, the first width, or the second width is determined based at least in part on a maximum distance, where the maximum distance is a constant.

In some embodiments, one or more of the first length, the second length, the third length, the first width, or the second width is determined based at least in part on a portion, $x3$, of a length of the corresponding region, where $x3>0$.

In some embodiments, one or more of the first length, the second length, the third length, the first width, or the second width is determined based at least in part on a portion, $x4$, of a width of the corresponding region, where $x4>0$.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 5A, 5B, 5C, and 5D illustrate example subsets of plurality of areas and global representations, in accordance with some embodiments.

DETAILED DESCRIPTION

Figure 1:
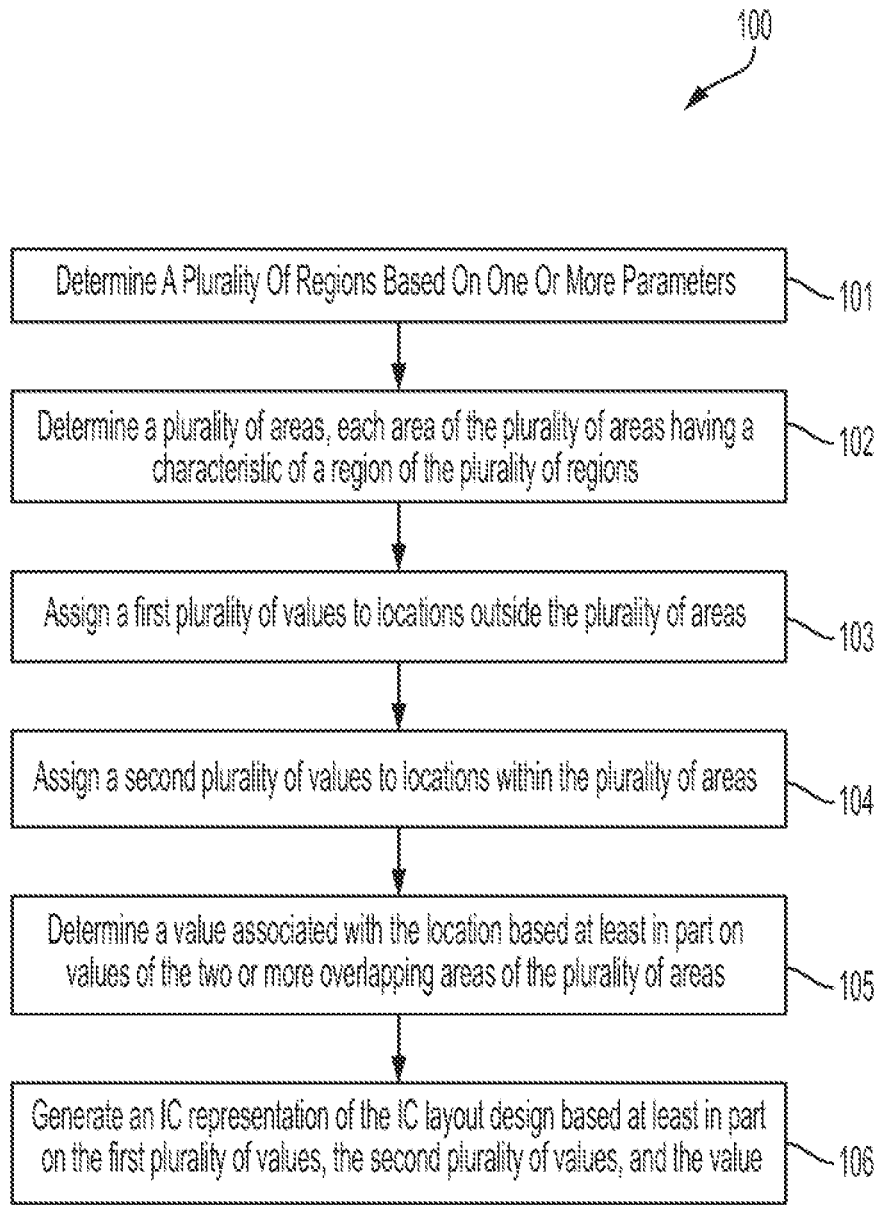
FIG. 1 is a flowchart illustrating an example for determining a continuous global representation of local data using effective areas in an integrated circuit layout, in accordance with some embodiments.

Aspects of the present disclosure relate to continuous global representation of local data using effective areas in integrated circuit layouts.

Integrated circuit (IC) layout involves a representation (e.g., or modeling) of an integrated circuit in terms of components that make up the IC, and the components are dependent upon characteristics of metal, oxide, or semiconductor layers that make up the components. IC layout places and connects the components that make up the IC so that they meet certain criteria (e.g., performance, size, density, manufacturability, and the like), and the ability for the components to meet the certain criteria depends on parameters or local values associated with component characteristics (e.g., some of which may not be well defined, measured, or understood).

In multi-dimensional (e.g., three-dimensional (3D)) integrated circuit modeling, some global effects may be characterized in terms of local parameters (e.g., local data). Local parameters may be well defined only at specific points or regions within a given integrated circuit (IC) layout, and local parameters may not be well defined at many locations of the IC layout. Parameters may be considered well-defined herein when they are unambiguous, consistent, or known (e.g., also may be understood with reference to the figures described herein). For example, the width of a polygon can be well defined at a point on its perimeter as a perpendicular distance from that edge inward until the perimeter is encountered again. In such examples, the width of the polygon may be considered well defined at the point but perhaps not at other points. Furthermore, local parameters may be discontinuous in that different values may be associated with adjacent locations where the local parameter values are actually well defined.

As used herein, local parameters refer to parameters of a layout that are well defined only at specific points or regions within an IC layout and are undefined or poorly defined at the remaining locations of the layout. Local data refers to local parameters as well as functions of the local parameters. As used herein, a uniform local region may refer to a point, line segment, or contiguous area of an IC layout that has uniform local parameters. In certain embodiments, local parameters may not be uniform, yet an average value for the local parameters may be used.

As used herein, an area of influence refers to an area associated with a uniform local region. In a tiled global representation according to embodiments herein, any region can be assigned a global data value (e.g., such as a thickness of a dielectric layer). A continuous global representation is defined at all locations and is continuous (e.g., smooth). A continuous global representation based on local data should be representative of the actual fabricated structure.

In multi-dimensional (e.g., 3D) integrated circuit modeling, it may be preferable that a global effect (e.g., a derived value such as thickness) be well defined everywhere throughout the layout, and that the global effect be smooth or continuous. In embodiments, a global effect may be considered smooth or continuous when values associated with a particular defined area transition gradually (e.g., as opposed to a sharp transition) from a first area having the particular defined parameter that is adjacent to a second area having the particular defined parameter, where the particular defined parameter differs from the first area to the second area. In some embodiments, smooth or continuous may refer to a difference in value between two points approaching zero as the distance between the two points approaches zero.

In various examples, a thickness of a dielectric layer associated with a particular IC layout might be described according to a function of width and spacing of lines in an interconnect layer. In such examples, the dielectric layer requires thickness as a smooth function of location, however the width and spacing of the interconnect layer may not be well defined everywhere throughout the IC layout.

Embodiments herein overcome the aforementioned drawbacks and more by enabling an approach (e.g., sometimes referred to herein as an effective area approach) whereby a continuous global representation of values across an IC layout is generated that depends on local data (e.g., local parameters associated with various locations of the IC layout). In embodiments, a tiled global representation is generated from effective areas associated with each region of the layout that has uniform and well-defined parameter values. As referred to herein, an effective area may include a plurality of locations of an IC layout to which values (e.g., predefined values) may be applied (e.g., a plurality of locations of an IC layout may be deemed within a defined effective area). That is, an effective area may include a plurality of locations of an IC layout to which a particular local set of parameters may be assigned (e.g., in place of actual parameters associated with the locations). In this manner, the continuous global representation has a uniform and defined parameter values.

Embodiments herein use areas of influence to establish a global representation of local data. That is, a tiled global representation of an IC layout. An area of influence is generated to represent each uniform region of the tiled global representation. Any location not in any area of influence is assigned a nominal data value for a particular parameter of interest. In embodiments, a nominal value may be a value associated with a location of an IC layout that is not near an area of influence (e.g., a region for which a value associated with the particular parameter of interest does not exist or is not known). Any location in a single area of influence is assigned the data value of that area of influence (e.g., for the particular parameter of interest).

In various embodiments, an area (e.g., or one or more locations of an integrated circuit layout) common to multiple effective areas may be assigned a data value that is determined based on the overlapping effective areas. In embodiments, an area not covered by any effective area may be assigned a nominal data value. In various embodiments, area-based averaging or other techniques can be used to create a smooth global representation.

FIG. 1 is a flowchart illustrating an example 100 for determining a continuous global representation of local data using effective areas in an integrated circuit layout, in accordance with some embodiments. In some embodiments, the present system may at 101 determine multiple (e.g., a plurality of) regions of an IC layout design based on one or more parameters, at least one of the regions having a characteristic. In some embodiments, the one or more parameters include parameters of the integrated circuit layout design which are well-defined and continuous at least within a region on the integrated circuit layout design. In some embodiments, local data includes parameters and functions of the parameters (e.g., thickness, which may be a function of the parameter width W and the parameter spacing S). In certain embodiments, the local functions are poorly defined where the local data is poorly defined. Additionally, the local functions are discontinuous where the local data is discontinuous.

Figure 3A:
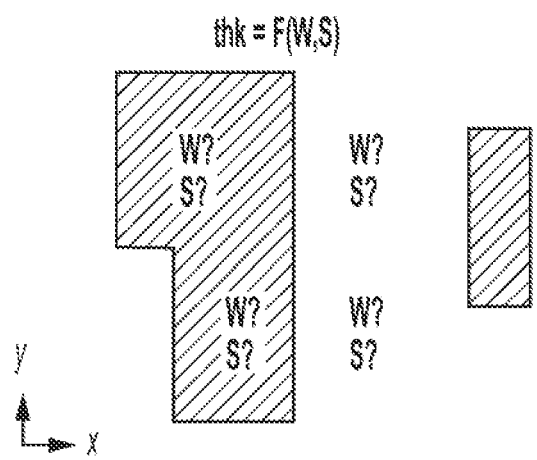
FIGS. 3A, 3B, and 3C illustrate example integrated circuit layouts, in accordance with some embodiments
Figure 3B:
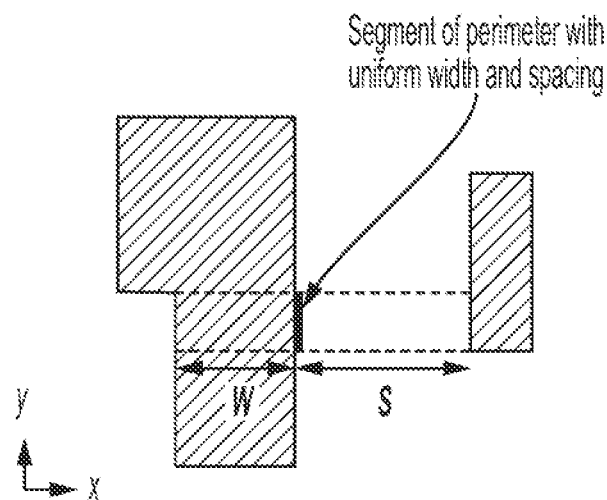
Figure 3C:
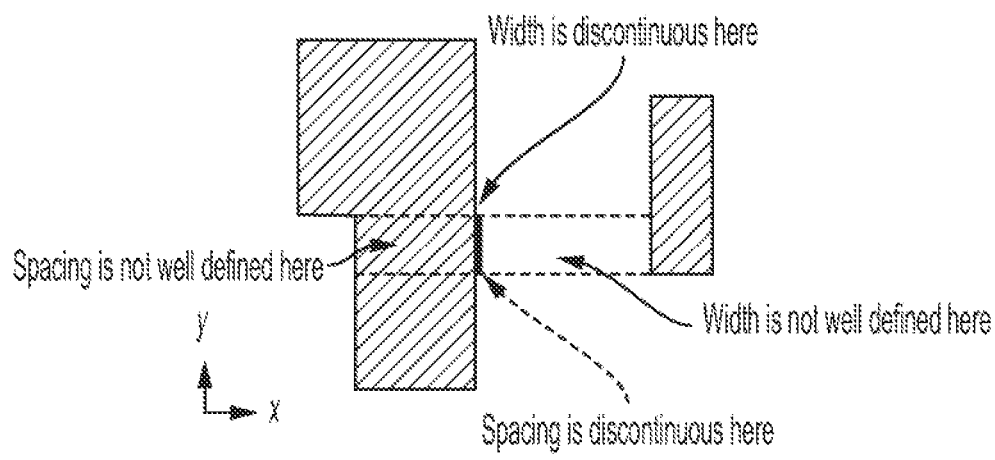

FIGS. 3A-3C are example integrated circuit layouts, in accordance with some embodiments. As shown in FIG. 3C, a spacing within an interconnect is not well-defined. As an example, a width is not well-defined between two adjacent interconnects (e.g., within a spacing). As another example, a width of an interconnect is discontinuous where the interconnect is non-uniform along the interconnect's height. In some embodiments, the local data and the parameters are not well-defined. In some embodiments, the parameters include parameters of the integrated circuit layout that are well-defined only at specific points or regions within the integrated circuit layout. Thus, in some embodiments, the parameters are undefined at remaining locations of the integrated circuit layout. Alternatively, in some embodiments, the parameters are poorly defined at remaining locations of the integrated circuit layout. In some embodiments, the parameters include local width, W, and local spacing, S, of an interconnect layer. In some embodiments, the width and the spacing are well-defined only at points on a shape's perimeter, where a perpendicular direction is well-defined. It will be appreciated that the shaded regions in FIGS. 3A-3C represent regions of an IC layout for which the width and spacing are not defined (e.g., no W or S exists and no effective area has been applied to those regions).

As shown in FIG. 3B, a segment of perimeter (e.g., an edge of an interconnect), is uniform where the segment of perimeter has a uniform width and spacing. In some embodiments, one segment (in y-direction) of an outline of a polygon has uniform values for width and spacing. In some embodiments, a uniform segment includes an edge of the polygon, or as part of an edge of the polygon, which has a same width and spacing along entire length of the polygon. In some embodiments, different parts of a perimeter of the polygon can have different width and spacing values. In some embodiments, a region is defined as a point which has uniform parameters. Alternatively, in some embodiments, the region is defined as a line segment which has uniform parameters. In some embodiments, the region is defined as a contiguous area which has uniform parameters.

Figure 4A:
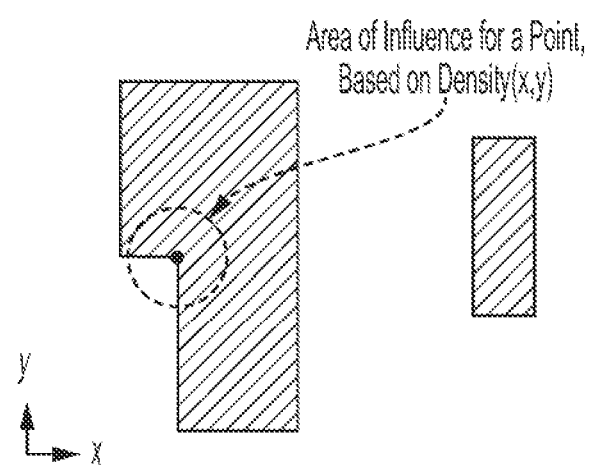
FIGS. 4A, 4B, and 4C illustrate example subsets of plurality of areas, in accordance with some embodiments.
Figure 4B:
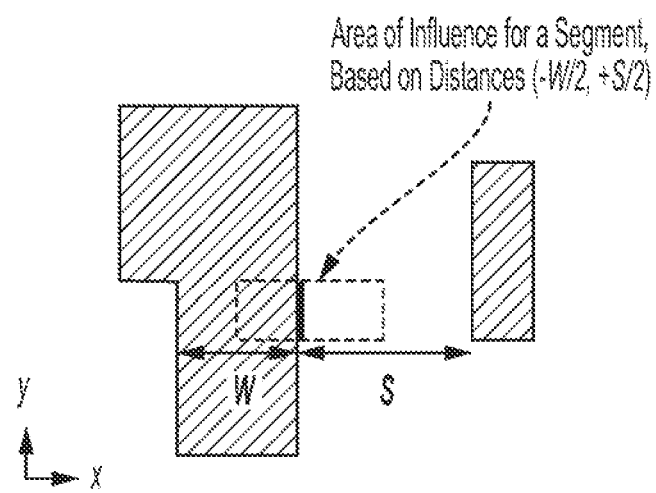
Figure 4C:
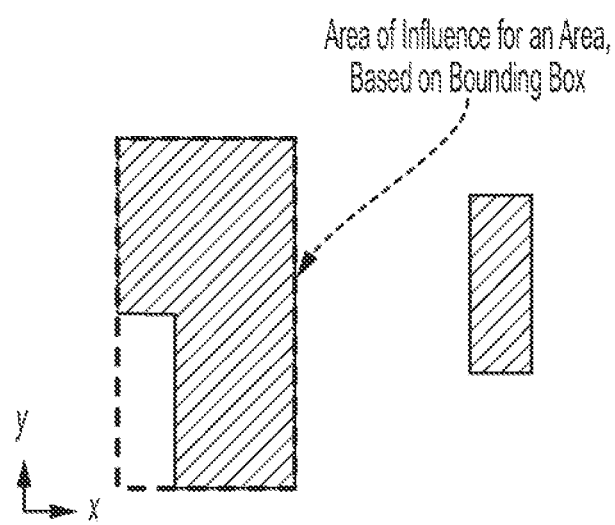

Returning to FIG. 1, in some embodiments, at 102, the present system determines a a plurality of areas (e.g., areas of influence as discussed above) associated with a corresponding region of the plurality of regions. FIGS. 4A-4C illustrate example pluralities of areas, in accordance with some embodiments. A plurality of areas can be associated with the region. As a non-limiting example, for a point, the plurality of areas is a region that includes the point. As another non-limiting example, for a line segment which has uniform parameters, the plurality of areas is a region which includes the line segment. As yet another non-limiting example, for a contiguous area which has uniform parameters, the plurality of areas includes the contiguous area. The plurality of areas associated with a region has the same parameter values as the associated region. A relationship between the region and the plurality of areas can depend on any of a variety of factors. In some embodiments, the relationship between the region and plurality of areas may be based on theoretical considerations including at least one of: parameters, functions of parameters, or functions of location. FIG. 4A illustrates a plurality of areas for a point based on a density at the point. FIG. 4B illustrates a plurality of areas for a segment based on distances, e.g., $-W/2$ and $+S/2$. FIG. 4C illustrates a plurality of areas for an area based on a bounding box.

FIG. 3A is an example integrated circuit layout, in accordance with some embodiments. In some embodiments, a W to S ratio (W/S) is used as a parameter. The W/S ratio is based on uniform line segments (e.g., with respect to width and spacing). In some embodiments, the W/S ratio is constructed from outlines of polygons. Additionally, in some embodiments, a specific subset of plurality of areas is determined. The specific subset of plurality of areas may include a rectangle which has a width matching the line segment. It will be appreciated that a rectangle is merely a non-limiting example for describing embodiments herein and that any shape or size of an area is within the scope of the present disclosure. It will also be appreciated that a location of an integrated circuit design may also be referred to herein as a point of the design, without limitation.

In some embodiments, the subset of plurality of areas is expanded to include more outline than the uniform segment. In some embodiments, the subset of plurality of areas is generated from the uniform region. In some embodiments, the subset of plurality of areas has different dimensionality than the uniform region (e.g., point, line segment, area). A 3D physical representation of an integrated-circuit layout requires smooth functions for accurate and self-consistent analysis. As a non-limiting example, a thickness of a dielectric layer should be defined at all locations throughout the integrated circuit layout. In addition, the thickness should generally be continuous (e.g., smooth), to avoid non-physical situations. Therefore, a function is defined as a continuous global representation.

As shown in FIG. 3A, the thickness of the dielectric, e.g., the thk, is a function of W and S. In such a case where the thickness thk of the dielectric layer is the function of width W and spacing S of an interconnect layer (e.g., the shaded regions), the thickness thk is poorly defined at any location where either W or S is poorly defined. For example, the thickness is undefined where the spacing S is zero (e.g., at one end of the integrated circuit layout).

Returning to FIG. 3C, for a uniform line segment based on the outline of a polygon, the subset of plurality of areas can be a rectangle defined by sweeping the line segment. In some embodiments, uniform edges parallel to the x axis are swept in y-direction, and the uniform edges parallel to the y axis are swept in x-direction. Distances swept in the x- and y-directions may depend on local factors, such as the values of W and S. As an example, for the W/S ratio, distances of $-W/2$ and $+S/2$ may be used. The negative sign denotes direction towards the interior of the polygon. The positive sign denotes direction away from the polygon. Additionally, in some embodiments, a maximum distance out can be clipped to a constant, or to a value that is a function of W, or other parameters, to limit the subset of plurality of areas for edges facing outside of the integrated circuit layout (e.g., where the spacing is infinite).

Figure 2:
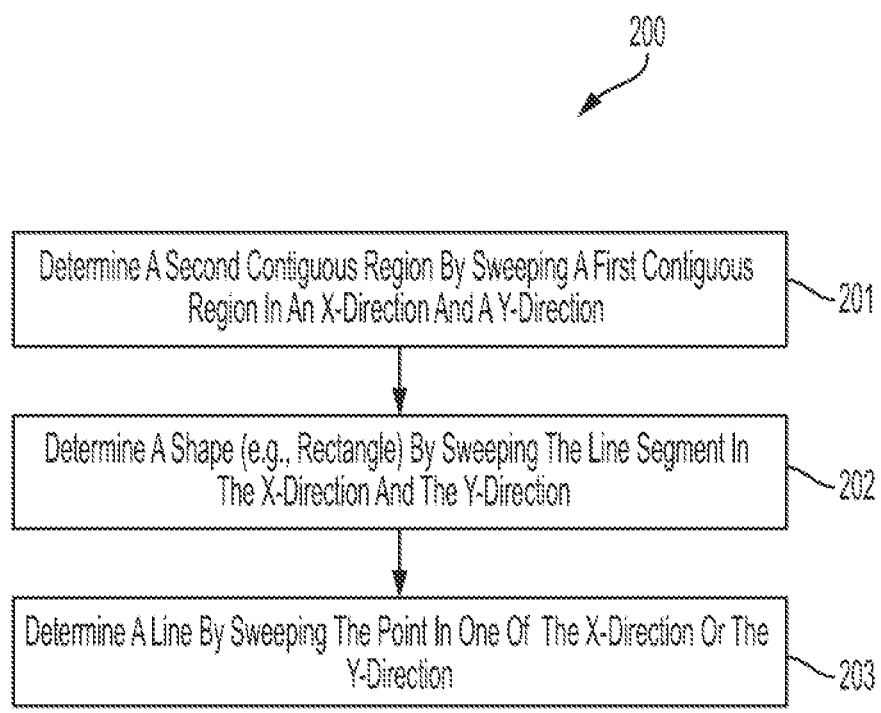
FIG. 2 is a flowchart illustrating an example for determining a plurality of areas associated with the plurality of regions, in accordance with some embodiments.

FIG. 2 is a flowchart illustrating an example 200 for determining a plurality of areas associated with the plurality of regions, in accordance with some embodiments. In embodiments, the present system, at 201, determines a second contiguous region (e.g., an area) by sweeping a first contiguous region in an x-direction and a y-direction. The present system may determine the second contiguous region for each contiguous region as a region. In some embodiments, the second contiguous region has a first length and a first width. In embodiments, the present system, at 202, determines a rectangle (e.g., an area) by sweeping a line segment in an x-direction and a y-direction. The present system may determine the rectangle for each line segment as a region. In some embodiments, the rectangle has a first length and a first width. In embodiments, the present system, at 203, determines a line (e.g., an area) by sweeping a point in one of: the x-direction, or the y-direction. In some embodiments, the line has a third length. The present system may determine the line for each point as a region. In some embodiments, one or more of first length, the second length, and the third length is determined based at least in part on a portion, x1, of a length of the length of the corresponding region in which x1>0. In some embodiments, one or more of the first width, and the second width is determined based at least in part on a portion, x2, of a width of the corresponding region in which x2>0. Alternatively, in some embodiments, one or more of the first length, the second length, the third length, the first width, and the second width is determined based at least in part on a maximum distance, in which the maximum distance is a constant. In some embodiments, one or more of the first length, the second length, the third length, the first width, and the second width is determined based at least in part on a portion, x3, of a length of the corresponding region in which x3>0. In some embodiments, one or more of the first length, the second length, the third length, the first width, and the second width is determined based at least in part on a portion, x4, of a width of the corresponding region in which x4>0.

Returning to FIG. 1, the present system, in embodiments, at 103 assigns a nominal data value to each point of the integrated circuit layout in locations outside of the plurality of areas. In embodiments, the present system, at 104, assigns a data value associated with the plurality of areas to each point of the integrated circuit layout located in the plurality of areas. In embodiments, the present system, in response to a determination that a point of the integrated circuit layout is located in two or more overlapping pluralities of areas, at 105 assigns to the point a value determined based at least in part on data values of each of the two or more overlapping pluralities of areas.

In embodiments, a global effect is a derived value such as thickness. The global effect is preferably well-defined everywhere within the integrated circuit layout or design and should be continuous (e.g., smooth). In embodiments, in 3D integrated-circuit modeling, some global effects are characterized in terms of the parameters, (e.g., the local data). The parameters are well-defined only at specific points or regions within the integrated circuit layout. The parameters are not well defined at many locations of the integrated circuit layout. In some embodiments, the parameters can be discontinuous. For example, although a parameter is well-defined in adjacent location, the parameter may have different values at the adjacent locations. For example, a thickness of a dielectric layer may be described as a function of width and spacing of lines in an associated interconnect layer. The dielectric layer requires thickness as a smooth function of location. However, because the width and spacing of the interconnect layer are not well defined everywhere, neither are functions of the width and spacing.

Continuing with reference to FIG. 1, the present system, in embodiments, at 106 generates an integrated circuit (IC) representation based at least in part on the aforementioned first plurality of values, second plurality of values, and generated values. That is, in certain examples, a model of the integrated circuit design may be generated using parameters based on the physical properties defined in accordance with the first plurality of values, the second plurality of values, and generated values. In embodiments, generating an IC representation for the integrated circuit may include parasitic extraction, general IC layout analysis, physical modeling of an IC layout, capacitance extraction, thermal modeling, lithography effect analysis, generation of compact device models, design rule generation, metal migration, interface resistance analysis, and the like.

Figure 5A:
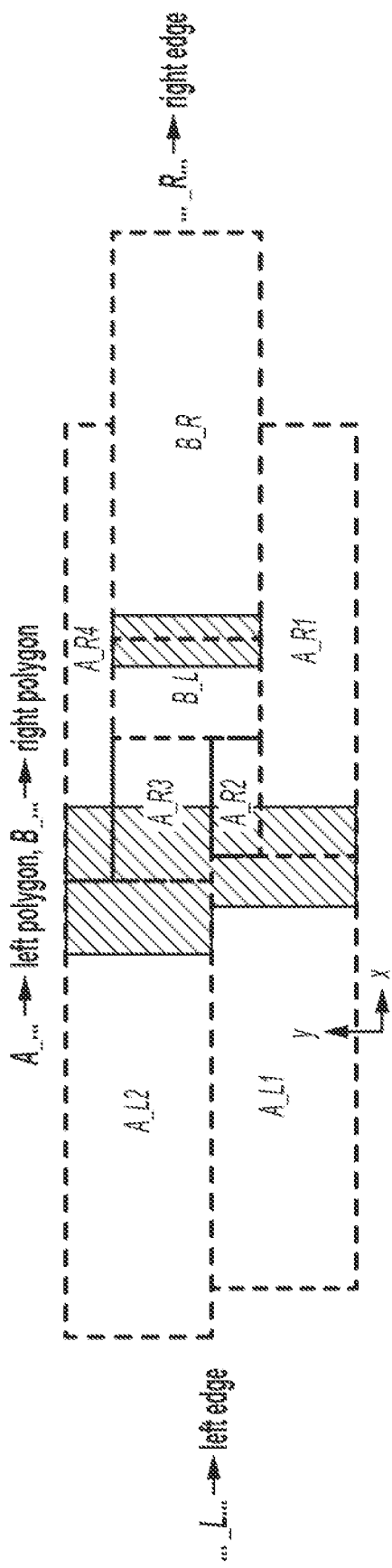
Figure 5B:
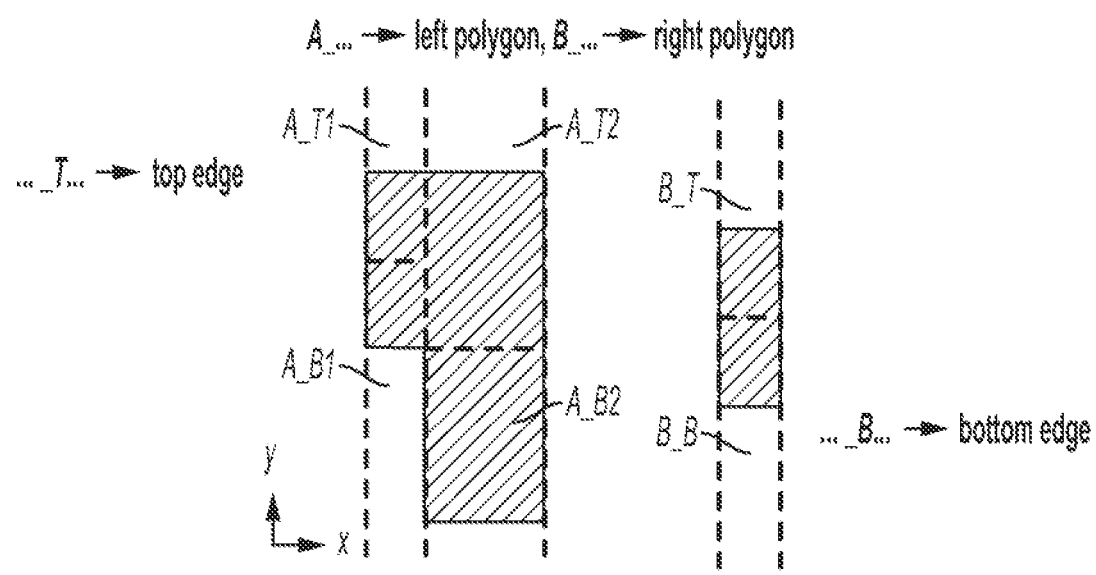

FIGS. 5A-5D illustrate example subsets of plurality of areas and global representations, in accordance with some embodiments. In some embodiments, the W/S ratio is restricted to Manhattan shapes. In Manhattan shapes, each edge is parallel to the x or y axis. In some embodiments, other angles can be handled by a staircase approach. For example, a staircase approach may include replacing a diagonal line by a staircase of horizontal and vertical lines. Alternatively, in some embodiments, other angles can be handled using a hybrid approach (e.g., a combination of a staircase and Manhattan approach; e.g., or using non-Manhattan effective areas). In some embodiments, the W/S ratio has two classes for pluralities of areas: a class of pluralities of areas directed in the x-direction, and a class of pluralities of areas directed in the y-direction. FIG. 5A shows a plurality of areas directed in the x-direction (e.g., based on uniform segments in y-direction and by using values of −W/2 (in) and +S/2 (out)) clipped to a constant maximum $S_{MAX}$. FIG. 5B shows a plurality of areas directed in the y-direction. In some embodiments where −W/2 and +S/2 are used, the present system generates a tiled description of all regions near polygons. A region of the integrated circuit design or layout which is within the $S_{MAX}$ laterally in the x-direction of any polygon is tiled by a union of the subset of plurality of areas directed in the x-direction. No area is covered by multiple pluralities of areas directed in the x-direction. Similar behavior occurs for a plurality of areas directed in the y-direction.

Figure 5C:
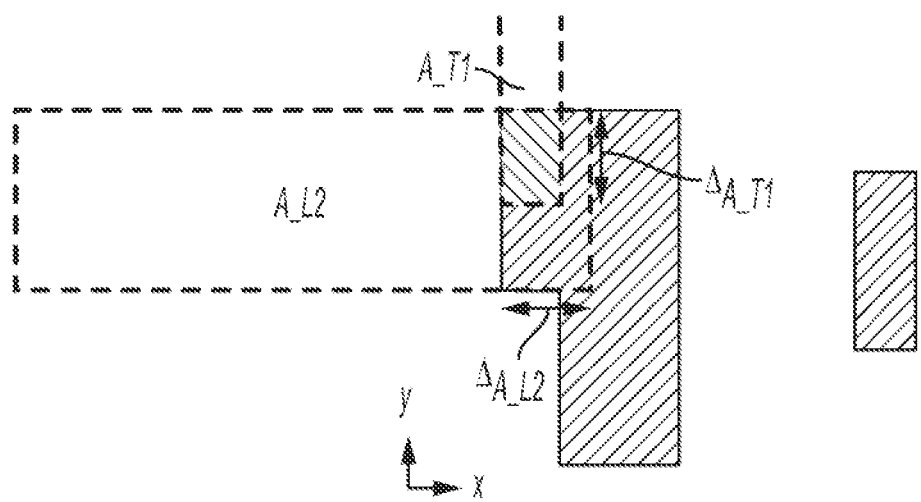

In some embodiments, intersection of multiple pluralities of areas have multiple associated values for parameters and for functions of parameters. FIG. 5C shows one such intersection between a plurality of areas directed in the x-direction, (e.g., A_L2), and a plurality of areas directed in the y-direction, (e.g., A_T1). In some embodiments, any suitable method can be used to resolve a discrepancy created by the intersection. In some embodiments, a weighted average method is used. In such embodiments, the weights of $1/\Delta$ are used, where $\Delta$ is a width of the plurality of areas from an associated uniform edge (e.g., the value of W/2 or S/2 for the uniform edge). For parameters $P_{A\_L2}$ and $P_{A\_T1}$, the average may be $[P_{A\_L2}/\Delta_{A\_L2}+P_{A\_T1}/\Delta_{A\_T1}]/[1/\Delta_{A\_L2}+1/\Delta_{A\_T1}]$. In some embodiments, a weighted average with weights of $1/\Delta^2$ is used. Alternatively, in some embodiments, a value with the smallest value of $\Delta$ is used.

FIG. 5D illustrates an example tiled global representation. In a tiled global representation, all regions are assigned a global-data value such as thickness of a dielectric layer. In some embodiments, a nominal region includes all regions that are not in any subset of plurality of areas. In such embodiments, the nominal region is assigned a nominal value. The nominal region is shown lightly shaded (e.g., with small dots) in FIG. 5D. In some embodiments, a region within a single subset of plurality of areas is assigned a value associated with the local region. In FIG. 5D, a uniform edge is shown as a region within a single subset of plurality of areas. In some embodiments, a region which is the intersection of multiple subset of plurality of areas is assigned a resolved value, based on parameters or on a function of those parameters. In some embodiments, the tiled global representation is a discontinuous global function.

The representation of the layout (e.g., tiled global representation) is a function that is well-defined everywhere, but can change abruptly across the interface or intersection between regions. In some embodiments, a continuous global function is derived from the discontinuous global function by finding the area-based average at any point. In some embodiments, the area-based average at a location (x, y) is found by considering each region (e.g., region i) within a square averaging window centered at (x, y). When the nominal value is 0, the area-based average may be given by equation (1) below:

$$\frac{\sum_{i=1}^{n} AiFi}{Awindow} \quad (1)$$

where Ai is the area of interaction region i that is within the window, Fi is an associated function value (e.g., a value assigned to a given point that may be a function of parameters), and Awindow is the area of the averaging window. In some embodiments, for a non-zero nominal value Fnom, the following equation (2) may be used.

$$\frac{\sum_{i=1}^{n} Ai(Fi - Fnom)}{Awindow} \quad (2)$$

Multiple windows, with different sizes, can be used. In some embodiments, the final result is a weighted average with same or different weights. For example, $$F = 50\% * F_{window1} + 30\% * F_{window2} + 20\% * F_{window3} \quad (3)$$

For example, selection of weights associated with the weighted average is dependent upon the associated function. As a non-limiting example, if thickness depends on a nearest edge, then averaging two thickness values may perhaps be stronger when the edge is nearer. In embodiments, an average function may be defined according to equation (4) below.

$$F_{avg} = \frac{1}{weightedAverage\left(\frac{1}{F}\right)} \quad (4)$$

In embodiments, an average function may be defined according to equation (5) below.

$$F_{avg} = (weightedAverage(F^k))^{\frac{1}{k}} \quad (5)$$

where k is a number.

In some embodiments, a map is generated by finding values for the continuous global function for points on a grid. To evaluate the global function at a point between grid points, interpolate in x-direction and in y-direction. In some embodiments, subset of plurality of areas are used to establish a global representation of local data. In such embodiments, a tiled global representation is first created. A subset of plurality of areas is generated to represent each uniform region. Any location not in any subset of plurality of areas is assigned a nominal data value and any location in a single subset of plurality of areas is assigned the data value of that subset of plurality of areas. Similarly, any location in multiple subset of plurality of areas is assigned a data value based on resolving the values of the various overlapping subset of plurality of areas. Finally, any of a variety of area-based averaging techniques can be used to create a smooth global representation of the local data. In one embodiment, local data includes width and spacing defined on the perimeter of interconnect-layer shapes. Each uniform line segment is represented by a rectangle extending from halfway inside the shape to halfway towards the nearest external shape.

Figure 6:
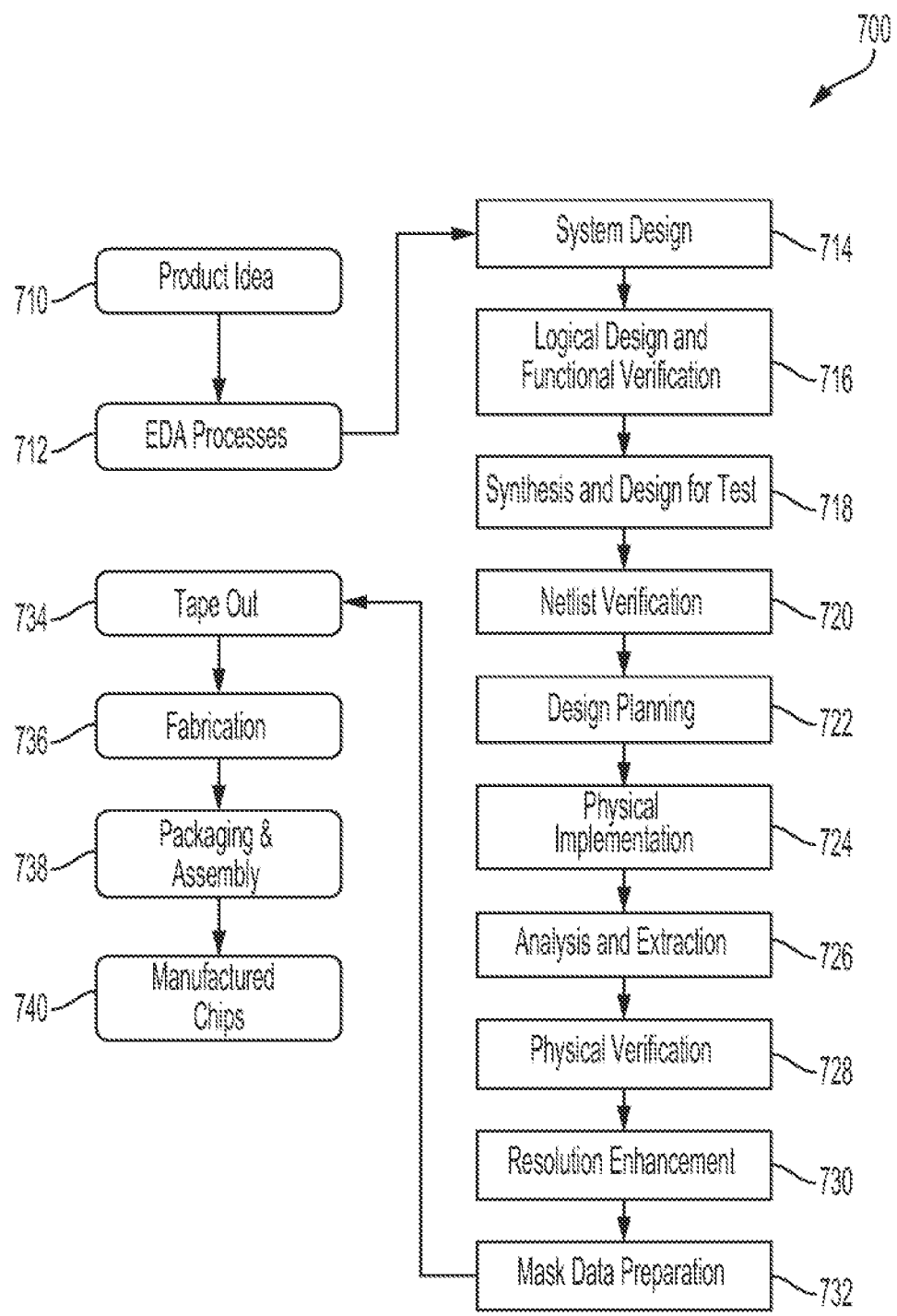
FIG. 6 depicts a flowchart of various processes used during the design and manufacture of an integrated circuit in accordance with some embodiments of the present disclosure.

FIG. 6 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 6. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 7) may be used to store the programs and data structures that are used by some or all of the EDA products described herein, and products used for development of cells for the library and for physical and logical design that use the library.

Figure 7:
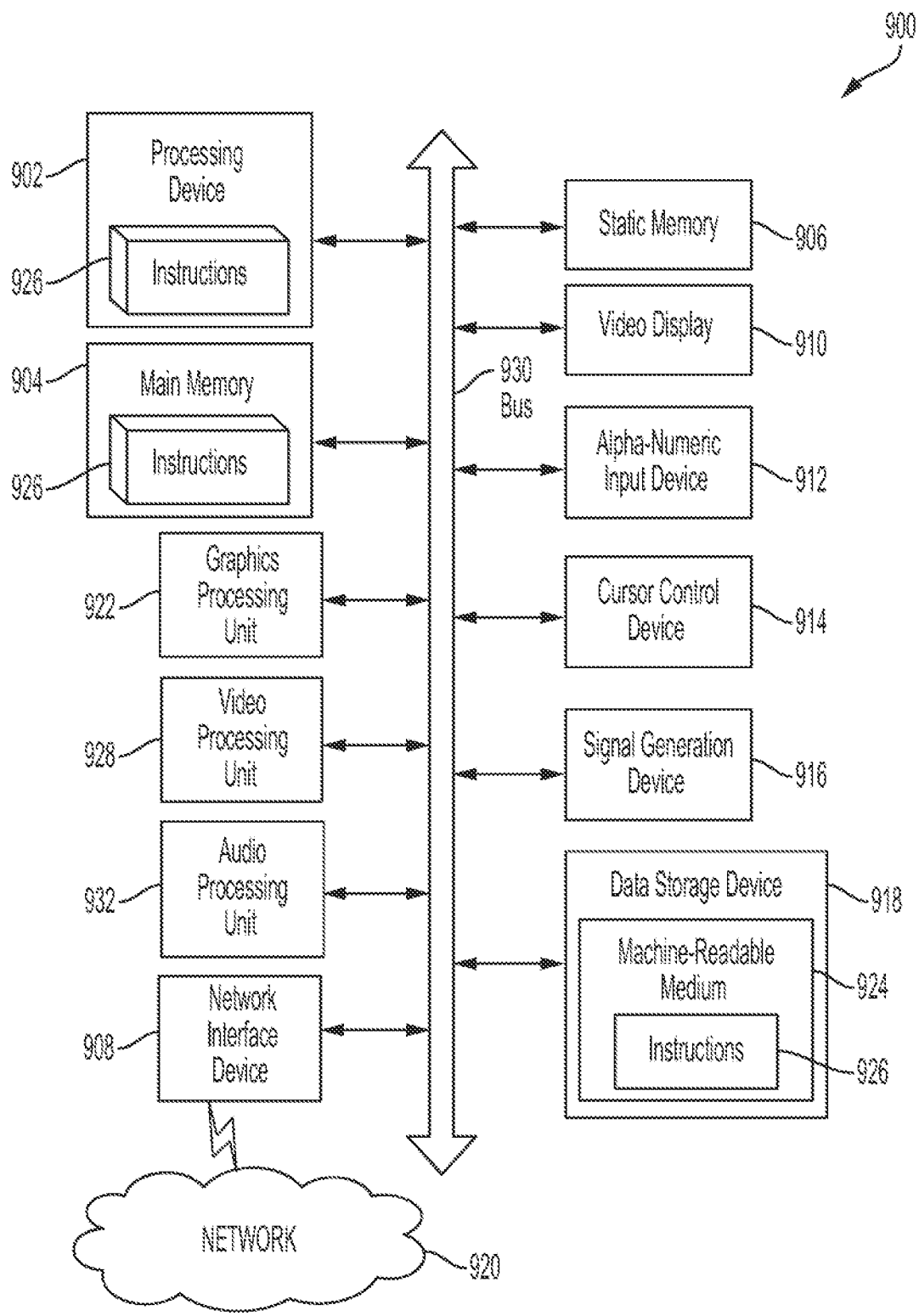
FIG. 7 depicts a diagram of an example computer system in which embodiments of the present disclosure may operate.

FIG. 7 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for representing a layout of an integrated circuit, the method comprising:
    determining a plurality of regions of an integrated circuit (IC) layout design based on one or more parameters, at least one region of plurality of regions having a characteristic;
    determining a plurality of areas, each area of the plurality of areas having a characteristic of a region of the plurality of regions;
    assigning a first plurality of values to locations of the IC layout design outside the plurality of areas;
    assigning a second plurality of values to locations of the IC layout design within the plurality of areas;
    in response to a determination that a location of the IC layout design is located in two or more overlapping areas of the plurality of areas, determining a value associated with the location based at least in part on values of the two or more overlapping areas of the plurality of areas; and
    generating, using a processor, an integrated circuit (IC) representation of the IC layout design based at least in part on the first plurality of values, the second plurality of values, and the value.

2. The method of claim 1, wherein the generated value determined based at least in part on values of the two or more overlapping areas of the plurality of areas comprises a weighted average of the values of the two or more overlapping areas of the plurality of areas.

3. The method of claim 1, wherein the plurality of regions comprises one or more of a plurality of points of the integrated circuit (IC) representation, a plurality of line segments of the integrated circuit (IC) representation, or a plurality of contiguous regions of the integrated circuit (IC) representation.

4. The method of claim 1, wherein the determining the plurality of areas comprises:
    for each contiguous region as a region,
        determining a contiguous region by sweeping the contiguous region in an x-direction and a y-direction, wherein the contiguous region has a first length and a first width;
    for each line segment as a region,
        determining a rectangle by sweeping the line segment in the x-direction, and the y-direction, wherein the rectangle has a second length and a second width; and
    for each point as a region,
        determining a line by sweeping the point in one of the x-direction, or the y-direction, wherein the line has a third length.

5. The method of claim 4, wherein one or more of the first length, the second length, or the third length is determined based at least in part on a portion, x1, of a length of the length of the corresponding region, wherein x1>0.

6. The method of claim 4, wherein one or more of the first width, or the second width is determined based at least in part on a portion, x2, of a width of the corresponding region, wherein x2>0.

7. The method of claim 4, wherein one or more of the first length, the second length, the third length, the first width, or the second width is determined based at least in part on a maximum distance, wherein the maximum distance is a constant.

8. The method of claim 4, wherein one or more of the first length, the second length, the third length, the first width, or the second width is determined based at least in part on a portion, x3, of a length of the corresponding region, wherein x3>0.

9. The method of claim 4, wherein one or more of the first length, the second length, the third length, the first width, or the second width is determined based at least in part on a portion, x4, of a width of the corresponding region, wherein x4>0.

10. A system comprising:
a memory storing instructions; and
a processor, coupled with the memory and to execute the instructions, the instructions
when executed cause the processor to:
determine a plurality of regions of an integrated circuit (IC) layout design based on one or more parameters, at least one region of plurality of regions having a characteristic;
determine a plurality of areas, each area of the plurality of areas having a characteristic of a region of the plurality of regions;
assign a first plurality of values to locations of the IC layout design outside the plurality of areas;
assign a second plurality of values to locations of the IC layout design within the plurality of areas;
in response to a determination that a location of the IC layout design is located in two or more overlapping areas of the plurality of areas, determine a value associated with the location based at least in part on values of the two or more overlapping areas of the plurality of areas; and
generate an integrated circuit (IC) representation of the IC layout design based at least in part on the first plurality of values, the second plurality of values, and the value.

11. The system of claim 10, wherein the generated value determined based at least in part on values of the two or more overlapping areas of the plurality of areas comprises a weighted average of the values of the two or more overlapping areas of the plurality of areas.

12. The system of claim 10, wherein the plurality of regions comprises one or more of a plurality of points of the integrated circuit (IC) representation, a plurality of line segments of the integrated circuit (IC) representation, or a plurality of contiguous regions of the integrated circuit (IC) representation.

13. The system of claim 10, wherein the determining the plurality of areas comprises:
for each contiguous region as a region,
determining a contiguous region by sweeping the contiguous region in an x-direction and a y-direction, wherein the contiguous region has a first length and a first width;
for each line segment as a region,
determining a rectangle by sweeping the line segment in the x-direction, and the y-direction, wherein the rectangle has a second length and a second width; and
for each point as a region,
determining a line by sweeping the point in one of the x-direction, or the y-direction, wherein the line has a third length.

14. The system of claim 13, wherein one or more of the first length, the second length, or the third length is determined based at least in part on a portion, x1, of a length of the length of the corresponding region, wherein x1>0.

15. The system of claim 13, wherein one or more of the first width, or the second width is determined based at least in part on a portion, x2, of a width of the corresponding region, wherein x2>0.

16. The system of claim 13, wherein one or more of the first length, the second length, the third length, the first width, or the second width is determined based at least in part on a maximum distance, wherein the maximum distance is a constant.

17. The system of claim 13, wherein one or more of the first length, the second length, the third length, the first width, or the second width is determined based at least in part on a portion, x3, of a length of the corresponding region, wherein x3>0.

18. The system of claim 13, wherein one or more of the first length, the second length, the third length, the first width, or the second width is determined based at least in part on a portion, x4, of a width of the corresponding region, wherein x4>0.

19. A non-transitory computer readable medium comprising stored instructions, which when executed by a processor, cause the processor to:
determine a plurality of regions of an integrated circuit (IC) layout design based on one or more parameters, at least one region of plurality of regions having a characteristic;
determine a plurality of areas, each area of the plurality of areas having a characteristic of a region of the plurality of regions;
assign a first plurality of values to locations of the IC layout design outside the plurality of areas;
assign a second plurality of values to locations of the IC layout design within the plurality of areas;
in response to a determination that a location of the IC layout design is located in two or more overlapping areas of the plurality of areas, determine a value associated with the location based at least in part on values of the two or more overlapping areas of the plurality of areas; and
generate an integrated circuit (IC) representation of the IC layout design based at least in part on the first plurality of values, the second plurality of values, and the value.

20. The non-transitory computer readable medium of claim 19, wherein the generated value determined based at least in part on values of the two or more overlapping areas of the plurality of areas comprises a weighted average of the values of the two or more overlapping areas of the plurality of areas.

* * * * *